(12) United States Patent
Mills

(10) Patent No.: US 6,397,219 B2
(45) Date of Patent: May 28, 2002

(54) NETWORK BASED CLASSIFIED INFORMATION SYSTEMS

(75) Inventor: Dudley John Mills, 30 Hutchison Crescent, Kambah 2902, A.C.T. (AU)

(73) Assignee: Dudley John Mills, Kambah (AU)

( * ) Notice: Subject to any disclaimer, the term of this patent is extended or adjusted under 35 U.S.C. 154(b) by 0 days.

(21) Appl. No.: 09/768,158

(22) Filed: Jan. 24, 2001

Related U.S. Application Data

(62) Division of application No. 09/021,832, filed on Feb. 11, 1998, now abandoned.

(51) Int. Cl.[7] .............................................. G06F 17/30
(52) U.S. Cl. ........................................ 707/10; 707/102
(58) Field of Search ................................... 707/10, 102

(56) References Cited

U.S. PATENT DOCUMENTS

| | | | |
|---|---|---|---|
| 5,864,862 A | * 1/1999 | Kriens et al. | 707/101 |
| 5,970,490 A | * 10/1999 | Morgenstern | 707/10 |
| 6,021,416 A | * 2/2000 | Dauerer et al. | 707/200 |
| 6,067,552 A | * 5/2000 | Yu | 707/5 |
| 6,230,168 B1 | * 5/2001 | Unger et al. | 707/501.1 |
| 6,247,047 B1 | * 6/2001 | Wolff | 709/219 |
| 6,253,198 B1 | * 6/2001 | Perkins | 707/10 |
| 6,263,362 B1 | * 7/2001 | Donoho et al. | 709/206 |

OTHER PUBLICATIONS

Web page W3.org/TR/RE–xml, Extensible Markup Language (XML) 1.0, Feb. 10, 1998.*

* cited by examiner

*Primary Examiner*—Wayne Amsbury
(74) *Attorney, Agent, or Firm*—Shanks & Herbert; Shelly Guest Cermak

(57) ABSTRACT

A system for automatically creating databases containing industry, service, product and subject classification data, contact data, geographic location data (CCG-data) and links to web pages from HTML, XML or SGML encoded web pages posted on computer networks such as the Internet or Intranets. The web pages containing HTML, XML or SGML encoded CCG-data, database update controls and web browser display controls are created and modified by using simple text editors, HTML, XML or SGML editors or purpose built editors. The CCG databases may be searched for references (URLs) to web pages by use of enquiries which reference one or more of the items of the CCG-data. Alternatively, enquiries referencing the CCG-data in the databases may supply contact data without web page references. Data duplication and coordination is reduced by including in the web page CCG-data display controls which are used by web browsers to format for display the same data that is used to automatically update the databases.

7 Claims, No Drawings

NETWORK BASED CLASSIFIED INFORMATION SYSTEMS

This is a division of application Ser. No. 09/021,832, filed Feb. 11, 1998, now abandoned.

FIELD OF INVENTION

This invention relates to network based classified information systems, to methods of automatically building searchable databases of classified information derived from web pages posted on a network, and, to web pages for use in such systems and methods.

The information systems and databases of most relevance to this invention are those which include classified product and service catalogues similar to the Yellow Pages telephone books, contact indexes similar to the White Pages telephone books, and/or subject indexes similar to Library catalogues. Such information systems and databases typically include sets of associated classification, contact and/or geographic items of information. For convenience, classification, contact and/or geographic information will be hereinafter called CCG-data.

The networks with which this invention is concerned are the worldwide public computer/communications network commonly known as the Internet and private networks—sometimes called intranets—which allow common access to markup documents on computers connected to the network. Markup documents are text files prepared using various markup languages such as HyperText Markup Language (HTML) and Extensible Markup Language (XML) which are implementations (or dialects) of the Standard Generalised Markup Language (SGML). The system of accessible files on the Internet is called the World Wide Web (WWW) and the markup documents themselves are commonly called 'web pages'. A web page is said to be 'posted' on a network when it is stored on computer-readable media of a host network computer as a file which is generally accessible to network users. A web page is transported from the host computer to a requesting computer through intermediate network computers as a computer-readable signal embodied in a carrier wave. Though this invention is not limited to Internet based information systems, these terms are used for convenience.

BACKGROUND TO THE INVENTION

It has been estimated that there are about 100 million web pages on the Internet and that the number is doubling every two years. Many of these pages include information concerning commercially offered goods and services and often include contact details. But the difficulty of locating such information is increasing faster than the growth in the number of web pages.

To assist network users locate web pages of interest, certain network service providers create indexes (or databases) of the contents of web pages posted (stored on computer readable media so as to be generally accessible) on the network and provide 'search engines' to use the indexes. These indexes are often created automatically by the use of 'web crawlers' which (i) interrogate computer after computer on the network to locate successive web pages and (ii) index the words in each web page encountered against the network address (eg Internet Protocol Address or IPA) and filing system path or universal resource locator (URL) at which the web page is accessible. Hereinafter the terms URL and URI (Uniform Resource Identifier) are taken to be identical in meaning and to signify network addresses and filing system paths. Usually, the indexes consist of a list of unique words with each word having an associated list of URLs of the web pages wherein the word was found to occur during interrogation. The URL serves as a 'hyperlink' which, if selected by a user/searcher, results in the associated web page being automatically transmitted from the computer where it is posted on the network to the user/searcher's computer where it may be displayed or otherwise processed. The sending and receiving of files in this way is greatly assisted by user interface programs called 'web browsers' (or more simply, 'browsers') such as Netscape and Microsoft Internet Explorer.

The search for web pages of interest using search engines leaves much to be desired:

- simple searches (those using a few keywords in simple combinations) often yield far too many web page references (URLs) to permit them to be interrogated one-by-one,
- complex searches (those using many keywords and/or complex Boolean expressions) require considerable expertise to undertake,
- even using optimum search criteria, many irrelevant web pages are referenced because of inconsistent use of terminology by those who author the original web pages,
- even using optimum search criteria, many relevant pages are missed, again because of inconsistent use of terminology by web page authors, and
- because items of information included in the body of web pages cannot be 'understood' or associated in useful ways by web crawlers; that is recognised as, say, a surname, a street name, a geographic locality, or type of goods or services and, say, a surname strongly associated with a street name, a geographic locality, or a type of goods or service.

The result is that information provided by search engines from databases which are automatically compiled using web crawlers is a very poor equivalent of the common Yellow Pages and White Pages directories which serve the telephone industry (though these directories are not, of course, automatically compiled from web pages).

In an attempt to improve the usefulness of automatically compiled network databases, some search engine providers make use of information contained in URLs, such as the country code and top level domain name codes such as 'com', 'edu', 'net' and 'org' which is sometimes used to signify the subject matter of web pages. It has been proposed to add more content classifying codes to URLs (eg, "chem" to signify chemical subject matter) to allow specialised databases—national, commercial, chemical, etc—to be generated. However, this proposal has serious drawbacks:

- URLs are Internet addresses and it is in principle undesirable to confuse the address function of a URL with that of representing a list of web page classifications or contact details.
- A URL is an inappropriate container of multiple web page classification codes and contact details because the length of the URL would cause it to become unwieldy as an Internet address.
- Including in a URL classification codes drawn from a list of thousands of codes would compromise the mnemonic quality of Internet addresses such as "www.yellowpages.com".
- There is substantial overlap in the subject matter contained in web pages having the various top level domain name codes.

There is no consensus on, or standard for, content classification codes in URLs.

Another proposal to add content classification data to web pages has arisen from the wish to identify pages containing material that may be offensive to some viewers, or should not be accessed by minors. The Platform for Internet Content Selection (PICS) (see www.w3.org/pub/WWW/PICS and other documents at www.w3.org) is a web page ratings standard similar in principle to the ratings systems for motion pictures. This system allows page authors to "internally" self classify their pages through use of the "<meta . . . >" HTML element. Alternatively, "external" PICS ratings of web pages may be obtained from ratings service providers accessed each time a URL is selected. In practice, the ratings service providers have adopted very limited range of web page classifications. For example, Ararat Software's Commercial Rating System (see www.ararat.com.ratings/ararat10.html.) provides just 5 categories of web page content; commercial content, technical/customer support, ordering information, downloading information and contact information. In other examples, CyberPatrol (www.microsys.com/pics/pics_msi.htm) provides 16 categories, the Recreational Software Advisory Council (www.rsac.org/faq.html) provides 4 categories, SafeSurf (www.safesurf.com/ssplan.htm) provides 11 categories and Vancouver Webpages Rating Service (vancouver-webpages.com/VWP1.0/ provides 11 categories. None of the categories provide classification of web pages by industry, service, product or subject with sufficient specificity to be useful when searching for web pages. Rather, the categories are intended to prevent web browsers from displaying web pages unsuitable for particular types of web browser users. Such rating systems are not intended to be used for the automated creation of Yellow or White pages like databases from web pages and are unsuitable for that purpose because they can not represent contact details. Further, the ratings data may only be encoded in the <meta . . . > element in the <head> of an HTML document drastically limiting the type and usefulness of the data that can be encoded.

Another proposal for classifying the content of web pages, the "Meta Content Framework" (MCF—see mcf.research.apple.com/mcf.html"), requires the content of web pages to be classified and the classification data to be held in a separate non-HTML data file with a MIME type of text/mcf. Storing data in non-HTML encoded documents which describes the content of HTML encoded documents is a technical and economic barrier to the adoption by search engine providers of the proposal. The MCF proposal is thus entirely unsuited to the automated creation of Yellow or White pages like databases from HTML encoded web pages (MIME type text/html) because data stored according to the MCF proposal is not stored in HTML encoded web pages.

The "Electronic Business Card", vCard, (see "vCard The Electronic Business Card" Version 2.1, versit Consortium Specification, Sep. 18, 1996 or ftp://ds.internic.net/internet-drafts/draft-ietf-asid-mine-vcard-01.txt) uses non-HTML data file (MIME Content Types of "text/plain" or the non-standard "text/X-vCard") containing contact information equivalent to an extended White Pages entry which can be exchanged on a network using Simple Mail Transfer Protocol (SMTP) or using HTTP. It can be associated with a web page by use of a URL in the web page which refers to the vCard information (eg <a href="www.thing.com/vCard.vcf">My vCard</a>). Version 2.1 vCard standard data file format (published Sep. 18, 1996) provides for the inclusion of many items of contact information. The vCard specification recommends that, where possible, there should be consistent mapping of vCard property names to HTML "<input>" element attribute names (eg vCard property name "TITLE" maps to HTML "<input name='title'>"). The intention is to facilitate the transfer of vCard data into web page input forms by pasting from a clipboard or by dragging from other computer applications. The vCard proposal is unsuited to the automated creation of Yellow or White pages like databases from HTML encoded web pages because data stored according to the vCard proposal is not stored in HTML encoded web pages.

The inclusion of classified information in separate documents (such as Meta Content files or vCards) has the disadvantage that there is necessarily much duplication of data and coordination of modifications between the separate documents and the web pages. This must be done to allow a person who has accessed a web page using an HTML compliant browser to determine whether it is worth calling up the associated file or vice versa. Also, to allow portions of web pages to be classified, web page contextual information would have to be duplicated in the separate document. vCards in particular do not provide this functionality. Another disadvantage is that non-HTML documents such as vCards contain no details as to how the data they contain is to be displayed. In the display of HTML documents the position, font, size, colour of the text and other elements of the document are of great importance. The restriction of address data in a vCard to untagged ordinally organised fields is inflexible. For example, multiple instances of extended parts of the address are not possible. Also components of names, addresses and telephone numbers and so forth are insufficiently identified.

The Online Computer Library Center Inc (OCLC, Dublin, Ohio, USA) proposal, known as the "Dublin Core", proposes to classifying scholarly web pages by subject (topic of the work, or keywords that describe the content of the work), title, author, publisher, other agent, date, object type (genre of the object such as home page, novel, poem etc), form, identifier, source, language, relationship and coverage (spatial and temporal) (see www.oclc.org:5046/~weibel/html-meta.html and other documents at www.oclc.org). This proposal does not include industry, service, product or subject classifications. It also does not include contact details. Names such as that of the author are not specified in sufficient detail to avoid ambiguities such as which is the author's first and last names. The proposal specifies that the details are encoded using the <meta . . . > element in the <head> of web pages. The proposal is unsuited to the automated creation of Yellow or White pages like databases from web pages because the proposal does not provide for classification of web pages and does not provide adequate contact details. Further, the use of keywords for describing the content of the work adds very little to the effectiveness of indexing of web pages since the web pages are usually indexed on every word of their content and most often the key words would simply be a duplication of words already contained in the document.

It has also been proposed to use the Dewey Decimal System (see orc.rsch.oclc.org:6109/eval_dc.html and orc.rsch.oclc.org:6109/bintro.html) to rank electronic documents against a Dewey Decimal subject classification. The proposal suggests automatically assigning Dewey Decimal subject classification codes to documents during automated indexing and cataloguing but does not specify the exact nature of the assignment although it is implied that the codes are stored separately from the documents. The proposal admits that such automated classification is less satisfactory than human classification. The proposal is unsuited to the automated creation of Yellow or White pages like databases from web pages because the accuracy of classification is inadequate, does not provide for inclusion of industry, service or product classifications and does not provide for inclusion of contact details. Deriving a subject classification code from an analysis of every word and phrase in a web page is computationally expensive.

The HTML 3.0 standard (see page 23 of the www.w3.org document "draft-ietf-html-specv3-00.txt") provides "class" as an attribute of almost all HTML "<body>" elements. The "class" attribute is intended to be used with style sheets. Style sheets provide a means by which the display of HTML documents may be altered to suit the needs of different classes of browser users. For example, <div class= "appendix"> could be used to define a division that acts as an appendix, <h2 class="section"> could be used to define a level 2 header that acts as a section header, although, of course, any string of characters could be defined for those purposes. The "class" attribute, although never having been suggested for holding goods and services classifications, is not suited for such a use as it is, in any case, undesirable to confuse the style sheet function of the "class" attribute.

The HTML 3.0 and earlier standards provided the HTML elements "<person>" and "<address>" but do not specify the form of the content or method of validating the content of those elements. A person's name may be written as first name followed by last name or last name followed by first name. Similarly, different conventions exist for writing addresses. Similar ambiguities arise in the ill defined format of the HTML elements "<person>" and "<address>". As such they are of little use in the automatic compilation of searchable databases.

The XML language (see: textuality.com/sgml-erb/WD-xml.html) was developed to extend HTML so that software vendors can add new elements and new element attributes to HTML which are not specifically defined in any HTML standard. The intention is to ensure that all new elements and attributes could be parsed by all XML parsers even if the new elements held no significance for any particular XML parser. However, like HTML, XML does not provide a standard for the representation of industry, service, product or subject classification, contact or geographic location details within an web page.

Of course, many useful databases of the Yellow Pages or White Pages type are made available by service providers on networks, but they are not compiled automatically by using web crawlers to scan HTML web pages posted on a network. For example, www.yellowpages.com.au and www.mcp.com provide classified advertisements of the Yellow Pages type with links to the web pages of paying advertisers or subscribers. There are also directories of email addresses which approximate the White Pages directories, listing the names of individuals and organisations and contact details, (eg www.bigbook.com and query1.whowhere.com). However, these email directories require listers to manually add their directory entries and enquirers to be aware of and to find the directory enquiry web page. They cannot be automatically generated by scanning web pages using web crawlers since there is no adequate mechanism to relate email addresses to the names of people and organisations and their other contact details which may also exist in the same web page.

OBJECTIVES OF THE INVENTION

The general object of the invention is to provide improved methods for automatically building searchable databases of classification, contact, and/or geographical information by using web crawlers to interrogate web pages posted on a network. [For convenience, this information is collectively referred to as CCG-data].

Other non-essential objectives are to provide methods for including and/or displaying CCG-data within web pages accessed by browsers, for automatically extracting CCG-data from web pages posted on a network and for using the same, and/or to provide methods for searching automatically compiled databases using such data.

Another subsidiary objective of the invention is to provide a new form of web page which is better suited to the automatic compilation (using web crawlers) of databases constructed by the automatic scanning of many such pages posted on a network.

OUTLINE OF THE INVENTION

The invention is based upon the realisation that highly useful databases can be automatically built by successively interrogating web pages posted on a network if one or more HTML encoded CCG phrases are included in the web pages. A CCG phrase is one containing CCG-data in a form which is directly accessible and identifiable. CCG phrases may also include one or more items which provide the web page author with control over how the CCG-data is applied to the database.

Data duplication can be reduced if some of the CCG-data in the coded CCG phrases can be displayed by browsers as well as being used to update databases. Errors due to inexactly duplicated data are also eliminated. Accordingly, it is envisaged that CCG phrases may include one or more items which provide the web page author with control over how the CCG-data is displayed by a browser.

HTML (including version 2 and version 3) and XML are evolving applications (sub-sets or dialects) of ISO Standard 8879 1986 known as Standard Generalised Markup Language (SGML). HTML, in large part, is a language used to describe how text (unstructured data) and graphics is to be formatted for display. The HTML language consists of a finite number of "elements" (for example; "<BR>" where "BR" is the element name, also called the tag name) which may contain "attributes" (for example; "<DL COMPACT>" where "COMPACT" is an attribute named "COMPACT") and may contain values associated with attributes (for example; "<FONT SIZE=+1>" where +1 is the attribute value of the attribute named "SIZE"). XML is a language used to describe structured data. The XML language is similarly composed of elements, attributes and values with a similar syntax to HTML but unlike HTML the element names which may be used are not restricted and the meaning of the XML data may be interpreted in any convenient manner. While the XML language is mute about how data described by XML is to be formatted for display, the data may be used by computer programs for any purpose including description of how XML coded data is displayed. However, due to its historic importance in connection with web pages, the term "HTML" is herein used to refer to all markup languages which are subsets or complete sets of the SGML language. In particular, the term "HTML encoded CCG phrase" and the synonymous term "CCG phrase" are herein used to refer to CCG-data encoded in a subset or complete set of the SGML language. Herein, a "web page" is a document adapted to be or actually accessible through a network and encoded in a subset or complete set of the SGML language.

For convenience, CCG items in HTML encoded CCG phrases, whether they are syntactically represented as elements or as attributes, will be referred to hereinafter as CCG attributes.

A CCG phrase includes at least one of the following identifiable types of CCG-data attributes:

industry, product, service, and/or subject classifications, contact categories, contact person(s) and/or organisation(s) names, titles or associations, contact details including physical and postal addresses, telephone and fax numbers, email and Internet or network addresses or locations, public keys, and geographic location details.

A CCG phrase may also include any of the following identifiable types of CCG control attributes:

database control attributes to indicate which parts of the data are to be used to update databases, and display control attributes to indicate how browsers are to display the data.

By virtue of occurring in the same CCG phrase, a plurality of CCG-data attributes are associated with each other.

By virtue of their occurrence in the same CCG phrase, CCG-data attributes are idententified as a set of associated attributes. However the degree of association between attributes can be controlled by the inclusion in the phrase of database control attributes.

The start and end of CCG phrases should be identifiable to clearly distinguish these phrases from other data. To identify the beginning and end of a CCG phrase, at least one HTML element should have a CCG specific HTML element name or CCG specific attribute name or CCG specific value. Each CCG attribute may consist, with or without other incidental characters, of a CCG attribute name and/or a CCG value or values. Preferably, each CCG phrase is contained in the "<body>" of the web page.

Two examples of a CCG specific HTML element are: "<CCG . . . >" or "<CCG . . . />" or "<CCG>. . . </CCG>". (Where a COG phrase is coded in XML, the elements "<XML>" and "</XML>" may also be needed at the start and end of the CCG phrase.) A less satisfactory example is: "<! - - CCG . . . - - > where the characters "CCG" after HTML comment element name "! - - " are used to signify that the comment contains CCG-data. An example of the use of a CCG specific attribute name is: "<START CCG>" . . . "<END CCG>". An example of the use of a CCG specific value is: "<START TYPE='CCG'>" . . . "<END TYPE='CCG'>". Obviously, other character strings could be substituted for the element name, element attribute name or element attribute value "CCG" string of the examples.

The codes "<CCG . . . >" and "<CCG . . . />" are compatible with most HTML specifications, but being non-standard HTML, most web browsers do not display any text or attributes (eg PQ="AQD") within the angle brackets "<" and ">". These codes are preferred where display of the CCG data is not required and compatibility with older browsers is required (eg CCG phrases containing only classification values).

From one aspect, therefore, the invention comprises a web page for posting on a network, the web page being characterised by the inclusion of at least one CCG phrase in the "<body>" of the page, the CCG phrase being such that the CCG attributes contained therein are accessible and identifiable by (i) HTML compliant editors and/or (ii) HTML compliant web crawlers for the automatic construction of databases of classified information, and/or (iii) HTML compliant browsers for display on the computer screens of network users.

From another aspect, the invention comprises a method of constructing web pages of the above described type. The web pages may be constructed on digital computers using simple text editors such as Microsoft Windows Notepad, or preferably, purpose built human controlled editors or automated composing programs which embody knowledge of HTML and CCG syntax and grammar. Which ever process is used, CCG attributes are selected and inserted, modified, deleted and/or organised to form a valid CCG phrases in HTML encoded documents and the documents are posted on computer readable storage devices of computers connected to a computer network so that the documents are generally available to computers on the network.

From another aspect, the invention comprises a method of populating a database with CCG-data extracted from web pages. Web pages posted on a network are successively retrieved by a digital computer program (eg: a web crawler) and CCG phrases contained therein are identified and at least some of the CCG attributes found within the CCG phrases are extracted. The CCG attribute names are used to determine the type of data in the associated values. Generally the CCG attributes of interest are those relating to classification, contact and geographic data and database update controls while the attributes of little or no of interest in relation to database updating are those relating to display controls. Of course, the CCG-data extracted need only be that relevant to the particular database being updated. For example, one database may have been designed to index only web page classifications and URLs while another database may have been designed to index only contact details. Databases also differ in their internal representation of data and means of associating data. For example, some use "flat file" tables, others use pointers to data to create network associations while others use hashing and buckets.

The conventional nomenclature differs considerably between different types of database. Depending on the particular database nomenclature, data of the same type is said to be stored in table columns, fields, attributes and properties. The terms column and field are somewhat related to the physical representation of the data in files while attribute and property is more related to the logical representation of data. To avoid confusion, with the terms "HTML attribute", "CCG attribute" or just "attribute", hereinafter a database property means both a type of data stored in the database and a place in the database where data of the same type is stored. Database properties are referred to by a name ("property name") or similar reference and contain values. For example, a database property with the name "City name" and which contains values which are all the names of cities may be defined as a "City name" type database property.

Whichever style of database is used, it is preferred that the database update program relate the CCG attributes to corresponding database properties used by the database update process so that the database property values are updated with CCG values in a manner which preserves the distinctness, content and meaning of the CCG values and, preferably, preserves the CCG value associations expressed in the CCG phrase as sets of associated database property values of different types.

In some cases, it is desired to know the address of the web page from which the CCG values were extracted. For example, the purpose of building a database might be to allow searching of the database by web page classification to provide a list URLs of web pages or URLs of portions of web pages which contain matching CCG classifications. The URLs could then be inserted in an HTML document and transmitted to a web browser as a list of references to web pages matching a search expression. In that example, associating the URL of a web page or the URL of a portion of a web page with the CCG values extracted from the same web page or web page portion is important and the URL or means of reconstructing it must be available and supplied to the database update process. In one style of database, the values of the same type are held separate rows in a column (property) of a database table, and pointers held in another column (property) are associated with the values by sharing the same table row. The table row constitutes a set of associated property values. Each pointer points to a bucket (block of data) containing a list of URLs or pointers to URLs held in a separate bucket or table. In another style of database, values of different types are held in different tables together with a set number, pointer or similar code which is used to indicate which values are associated as members of the same set. In one variation, the values of set members are prefixed with a code indicating the type of value and all values are held in the same column of a table. If the purpose of the database is to hold contact data, recording the web page URL in the database might not be required although if the URL is not present in the database, updating changes in the CCG contact details contained within a web page is more difficult. Of course, one database may be used to record all types of CCG values contained in web pages and associate with each other any and all values extracted from the same web page or even from other web pages.

From another aspect, the invention comprises a method of searching the databases constructed as outlined above. These databases may be used for a variety of searching purposes. For example, to find web page URLs by using the association of web page URLs with industry, service, product or subject classification or a person's or organisation's name or address or geographic location values or any combination thereof. In another example, the databases may be used to find the contact details for people or organisations by name or location of industry, service, product or web page subject type and so forth by using the association between items of the contact details in the database without having to retrieve web pages associated with the contact details.

More particularly, the searching method involves finding URL references, or finding sets of associated database property values, from databases containing CCG-data. The method including steps of parsing a query phrase received from a computer network to extract query relational expressions and, from each expression, deriving a query field name, query relational operator and query value, determining the type of the query field by reference to its name, relating the query field to a corresponding database property according to type and locating CCG-data database property values in the database property which return a true value when tested against the query value using the query relational operator. Finally, the URL references or the sets of property values associated with the so located CCG-data database property values are extracted.

Database queries are usually expressed in a query language in the form of a phrase or sentence. In query by example style enquiry systems, the user types values into input fields on a form and a program extracts the input values and uses the values to automatically compose a query phrase or sentence. There are many existing examples of query languages used in connection with databases. Generally, they consist of relational expressions (eg Field= Value), logical expressions and grouping of relational and logical expressions by means such as parentheses. They may also contain sorting and output formatting expressions. Often abbreviated notation is used in the expressions such as leaving out field names or relational operators which are then inferred from the value in the expression or implied by default. In an enquiry the nature and format of the output may also be implied, such as a list of URLs of web pages or a list of contact details. Whatever is the mechanism of any particular database, the query expression needs to be parsed and fields in the query expression, explicit, default, implied or inferred, need be related to database properties of similar type. In some styles of database enquiry the query expression is evaluated against each row of a table or record of a file to find rows or records (ie a set of associated property values) which match the query expression. In other styles, sub-sets of the values of the properties are selected according to the interpretation of relational expressions in the query expression and the sub-sets are combined according to logical and grouping expressions in the query to find the sets of associated property values which match the query expression. Often, to make logical operations which combine the selected sub-sets more efficient, it is not the values which are selected but pointers to the values (eg Table name and table row) or unique keys (eg URLs or pointers to URLs) associated with the values. For example, the AND logical operator is often used to combine two lists so that only values or pointers or keys common to both lists are found in the combined list. Usually, the query produces a result list which is then provided to other processes. For example, a list of URLs of web pages is processed to produce an attractively formatted HTML encoded document containing the URLs and is sent to a web browser to allow an enquirer to retrieve interesting web pages. In another example, the contact details associated in the database with each value or pointer in the result list are retrieved from the database and presented as a report in the form of an HTML encoded document and is sent to a web browser for viewing.

From another aspect, the invention comprises a method of displaying CCG-data contained in CCG phrases within web pages which are displayed by a web browser executing on a digital computer. While a web page is loading or has loaded in a web browser, the web browser parses the web page and displays the text (or data) of the web page on a display device connected to the computer. When the web browser parser encounters CCG phrases, the web browser may display the CCG-data (element and/or attribute names (or translations of element and/or attribute names) and/or values) in a number of browser specific ways. For example, the web browser may by default not display any CCG-data, display all CCG-data, not display any CCG-data until a CCG display control attribute explicitly states that subsequent data should be displayed or display all CCG-data until a CCG display control attribute explicitly states that subsequent data should not be displayed. The web browser may also use CGA display controls specifying the size, font, position and so forth to alter the display of the CCG-data.

DESCRIPTION OF EXAMPLES

Having indicated the nature of the present invention, examples or embodiments thereof will now be described by way of illustration only.

Example 1

HTML Syntax Suitable for Representing a CCG Phrase

The following is an example of HTML element syntax suitable for representing CCG phrases in which a control (e.g. "SHOW") may be "good until countermanded" and thus apply to more than one field:

```
<CCG HREF="url"
{{NAME="label"|ID="identifier_code"}&| {LANG="language_code" &
CLASS="Class_name"}
{
   {SET_SEPARATOR}&|
   {INDEX|NOINDEX}&|
   {SHOW|HIDE}&|
   {XPOS="horizontal_position_number"}&|
   {YPOS="vertical_position number"}&|
   {NEWLINE}&|
   {ALIGN=centre|left|right|justify}&|
   {SIZE=[+/-]1|2|3|4|5|6|7}&|
   {COLOR="#rrggbb"|"colour_name"}&|
   {FACE="type_face_name"}&|
   {BLINK &| BOLD &| UNDERLINE &| ITALIC &| STRIKE}&|
   {SUBSCRIPT|SUPERSCRIPT}&|
   {CLEAR{=left|right|all}}
   {NORMAL}&|
   {{{CONTACT &| COPYRIGHT &| DEVELOPER}&|
   {PERSONAL &| BUSINESS &| ASSOCIATION}&|
   {attribute_name="attribute_value(s)"}
}
...
>
``` where: the ellipsis ". . . " implies optional repetition of the braced ("{" "}") items; the braces are used to group items and are not CCG syntactic elements; "&" (and) implies items must occur together; "|" (or) implies only one item must occur; and "&|" .(and/or) implies any including none of the items may appear together.

Using the syntax of this example, each CCG phrase is represented as an HTML element, the element name being "CCG" and the CCG-data (eg attribute_name="attribute_value") and CCG controls (eg SIZE=+1) are represented as attributes of the HTML element. Some of the attributes (eg SIZE) having explicit values (eg +1) and some attributes have implied values depending on the presence or absence in a CCG phrase (eg when the attribute BUSINESS is present it has the implied value of True and the implied value of False when absent).

Representation in XML syntax requires, at most, only a simple translation. All the items, such as "NORMAL" and "attribute_name" may remain unchanged as attributes of the element named "CCG" (eg <CCG size=+1/>). However, when a CCG phrase is encoded in XML, it is preferred that the items are represented as XML elements. For example attribute "SIZE=+1" can be represented as element "<size>+1</size>" or "<size value=+1/>" and "NORMAL" can be represented as "<normal/>.

In this example, the attributes, ID, LANG and CLASS take their meanings from HTML 3.0. The "url" in HREF= "url" or may be a link with or without destination anchor labels. For example the URL www.w3.org/docs.html does not contain a destination anchor label (or identifier) while www.w3.org/docs.html#searching does contain the destination anchor label "#searching" which is intended refer to an anchor in docs.html such as <A NAME="searching"> . . . </A>. There is some confusion in various HTML standards documentation about the distinction between the expression NAME="label" and the expression ID="identifier_code". For most practical purposes the two expressions have the same function or meaning: to uniquely identify within a document a position in or portion of that document.

Database control attributes:

"Set_separator" indicates the end of association between preceding and following data other than through the weaker mutual association with the same CCG phrase or web page; the data are divided into sets. "Index | Noindex" indicates that the following data are/are not to be indexed by a web crawler. These attributes have an implied attribute value of 'True' if present in and 'False' when absent from a CCG phrase.

Display control attributes:

"Show | Hide" indicates that a browser should show/not show the following data. Xpos and Ypos indicate the position (for example in pixel or physical units) on the browser screen where the data is to be displayed. "Newline" may be used in addition or as an alternative method of placing text on a browser screen. "Align" indicates the positioning of data on a browser screen relative to the cursor position set by "Xpos", "Ypos" or "Newline". "Size", "Colour" and "Face" indicates the size, colour and type face or font of the following data when displayed on an browser screen. "Blink", "Bold", "Underline", "Italic", "Strike", "Superscript" and "Subscript" indicates that the following data should be displayed blinking, bold, underlined, italicised, struck through, superscripted or subscripted. "Clear" indicates that the browser screen in the region where data will be displayed should be cleared to background before displaying the following data. "Normal" indicates the data is to be displayed without the "Blink", . . . , "Clear" characteristics. The display controls which consist of an attribute name without an explicit value have an implied value of 'True' when present and 'False' when absent.

CCG-data attributes:

"Contact &| Copyright &| Developer" indicates that the following CCG-data refers to details for a person or organisation and/or to the copyright owner and/or to the HTML or web page developer. "Personal &| Business &| Association" indicates that the following data refers to details for a person and/or business and/or association. The previous CCG-data attributes have an implied attribute value of 'True' if present in a CCG phrase or set and 'False' when absent from a CCG phrase or set. The attribute_name could be standard CCG attribute names or synonyms of standard CCG attribute names or abbreviations of CCG attribute names which refer to the following types of CCG attribute values where square brackets "[" and "]" surround suggested attribute names:

industry or service or product or subject classifications and sub-classifications:
classification name [CN],
classification codes [CC].
display only text [TEXT].
contact:
person:
courtesy title [PNC],
first given name [PNG],
other given names [PNO],
family name [PNF],
name suffix [PNS],
qualifications [PQ],
associations [PA],
contact person title [PT],
contact person role [PR].
organisation:
name [ON],
unit [OU],
identifier [OID].
physical or post or delivery address:
type [AT] (="PHYSICAL" &| "POST-OFFICE" &| "POSTAL"&| "DELIVERY")
post office box number [AP#]
post office name [APN]
room or suite or office or unit or flat or apartment name &| number [AB#], floor name &| number [ABF],
building name [ABN],
lane or street or road or highway number [AS#],
lane or street or road or highway name [ASN],
suburb or town or city name [ACN],
region or state or territory or province name [ARN],
post code [APC],
country or nation name [ANN],
telephone:
    type [TT] (="PREFERRED" &| "VOICE" &| "MOBILE" &| "CAR" &| "MESSAGE" &|"PAGER" &| "FACSIMILE" &| "MODEM" &| "ISDN" &| "VIDEO")
    nation or country code number [TC#],
    trunk access number [TT#],
    area code number [TA#],
    local number [TL#],
email:
    type [ET] (="INTERNET"| {other}),
    mailer [EM],
    address [EA],
Internet address:
    url [IURL].
date & time:
    date & time from [DTF],
    date & time to [DTT],
    weekday from [DTWF],
    weekday to [DTWT],
    weekday time from [DTWFT],
    weekday time to [DTWTT],
    time zone [DTZ].
brand name [BN].
public key:
    key type[KT].
    key [K],
geographical:
    location units [GLU],
    location [GL],
    serviced region units [GLRU].
    serviced region [GLR], Suggested attribute name [CN] is the name of an attribute associated with the attribute value containing "classification name" type data. For example, the [CN] attribute value could be the name of a proprietary or national or international or other industry classification standard such as the Australian and New Zealand Standard Industry Classification or "ANZSIC" for short or the U.S. Bureau of the Census Industrial Classifications (USBCIC). The associated classification codes [CC] attribute value could contain the codes and/or descriptions of the codes of the named standard with or without modifications, deletions or extensions. For example: CN="ANZSIC" CC="61; Road transport" or CN="USBCIC" CC="581; Hardware store". Service classifications such as the International Standard Classification of Occupations could be used. For example: CN="ISCOO" CC="4430; Auctioneer" Product classifications such as the Harmonised Commodity Description And Coding System could be used. For example: CN="HSC" CC="8411; Turbojets, turbopropellers & other gas turbines; parts thereof" For subject classifications, Dewey Decimal, and/or Universal Decimal and/or Library of Congress and/or Bliss and/or Colon Classification could be used. For example: CN="DDC" CC="577.699; Sea shore ecology" The inclusion of subject classifications provides a very simple, straightforward method of classifying the subject matter of an HTML document which could be attractive to commercially oriented copyright owners.

The text ([TEXT]), person ([PNC]-[PR]), organisation ([ON]-[OID]), physical or post or delivery address ([AT]-[ANN]), telephone ([TT]-[TL#]), email address ([ET]-[EA]) and Internet address [IURL] are intended to be associated with each other in the obvious manner. Date & time(s) ([DTF]-[DTZ]) are intended to indicate the times at which the address and/or telephone and/or email will be serviced by the associated person(s) and/or organisation(s). The brand name ([BN]) attribute is intended to hold commercial brand names. Public key ([KT]-[K]) is intended to hold public encryption keys for secure communication with the contact person or organisation.

The geographical location [GL] could be a latitude and longitude (eg E148D31'12.5", S36D40',09.6" or E148.5201, S36.6693 or −148.5201, −36.6693), or a Universal Grid Reference (eg 55FV364402) or other global, national, regional or local location reference with units as specified [GLU], which is typed in or obtained by pointing to a digitally encoded map or other methods. In more populated regions of some countries such as the U.S., street addresses and post codes are associated with a moderately accurate geographic location and can be used to interpolate geographic location data where geographic location data is not explicitly stated in the CCG-data. Using a universally recognised code such as latitude and longitude has advantages when used with international mediums like the Internet. Geographical location is intended to be associated with a post, delivery address or physical address such as place of business or residence. A CCG compliant browser could use this reference to display a map centered on that geographic location. The purpose of the geographical location data is to allow browser users to specify search engine search criteria which will result in the search engine selecting only those Internet accessible documents which provide details about providers which are within a specified region. The serviced region [GLR] is intended to indicate the preferred area of operation of providers expressed in terms of serviced region units [GLRU]. A radial distance (eg in kilometres) or alternate means of expressing an area of interest around a geographic point, such as polygons, are envisaged.

It is envisaged that the CCG attribute_value could be composed of more than one value (actually sub-value) wherein specific characters or character strings separate individual values.

While specific instances of element names and types have been given in this example, of more importance is the type of data and type controls over the display and indexing of the data. As an alternative to the preferred immediately following example where the CCG-data is lumped together under the HTML element named "CCG", certain elements of the data, for example the classification data, could be lumped under separate HTML elements with distinctly different names thereby separating CCG classification data from CCG contact data. However, this is not preferred because the strength of association between the two types of data is weakened.

Example 2

Classification of Portion of a Web Page

Where it is desired to classify a portion of a web page, such as a paragraph about a product, simple CCG-data may be used in conjunction with the syntax of Example 1. For example:

```
<A NAME="Radios">AM-FM radio receivers: </A>
  <CCG HREF="#Radios">
    CN="ANZSIC"
    CC="E23.34.78;Electrical equipment - radio receivers AM"
    CC="E23.34.79;Electrical equipment - radio receivers FM"
  </CCG>
```

We won't be beaten on the price of these high quality receivers . . . In this example, the CCG prase appears after the related anchor (<A NAME= . . . </A>). However, while such proximity visually provides an obvious association between the anchor and related CCG phrase, it is intended that CCG phrase containing the attribute HREF related to a specific anchor could appear anywhere within the body of a web page and remain related to the named anchor. The CCG phrase containing the attribute HREF could appear in a separate document and thereby relate the CCG-data to the entire document or to a named anchor although, as previously noted, coordinating separate documents can be problematic. In the absence of the HREF and NAME attributes, it is also intended that the CCG-data apply to the whole web page.

Example 3

Classification of Portion of a Web Page using XML Syntax

Using XML syntax and similar attribute names to those of Example 2 the HTML fragment of Example 2 may be rewritten as:

```
<A NAME="Radios">AM-FM radio receivers: </A>
  <XML>
    <CCG>
      <HREF>"#Radios"</HREF>
      <CN>"ANZSIC"</CN>
      <CC>"E23.34.78;Electrical equipment - radio receivers AM"</CC>
      <CC>"E23.34.79;Electrical equipment - radio receivers FM"</CC>
    </CCG>
  </XML>
```

We won't be beaten on the price of these high quality receivers . . . This example demonstrates that the translation of CCG-data from HTML to XML (and the reverse) involves simple syntactical and grammatical translations. Of course, the resulting HTML and XML, while "well formed" might not be recognised or, if recognised, might not be understood by some parsers.

Example 4

Constructing a Web Page Containing CCG-data

As an example, a web page developer, Alice Jamieson, is preparing an advertisement for a local electrician John Williams, trading as Kelso Electrical, who wants to advertise on the web for business within 30 kilometers from his office located at 18 Raglan Street, Kelso, New South Wales. Alice uses a graphical user interface web page authoring tool capable of creating and modifying web pages containing HTML (and XML) CCG phrases by accepting inputs from a user. The tool executes on a digital computer having input devices such as a keyboard, mouse, light pen and touch pad, display devices such as a CRT, LED arrays, liquid crystal arrays and computer-readable media such as magnetic and optical disks, memory arrays, magnetic tape and the like.

The authoring tool also embodies knowledge of the content and structure of CCG phrases such as the attribute names, valid ranges and sets of associated attribute values, the normal order of the attributes in the CCG phrase and interdependencies between attribute values. The tool provides a window where web pages may be viewed in layout (browser) mode and another window where the HTML code may be viewed in editing mode. The tool also provides means of inserting, deleting, modifying and organising HTML elements, changing font size, face and colour and so forth. The tool provides means for the user to build CCG phrases by using input devices to select an edit control representing various types of CCG attributes from a list which the tool then inserts in the body of a web page together with, when not already present, HTML code indicative of the start and end of a CCG phrase. The user then types in the value in the attribute. Similarly, the tool provides means of converting web page text to CCG attributes. Using input devices, the user selects the text to be converted to a CCG attribute then selects an edit control from a list; the tool then inserts the HTML code necessary to encode the text as a CCG attribute. However, these semi-manual methods of creating and modifying CCG phrases are inefficient and error prone. The tool also provides a button, which can be activated by using input devices, for access to CCG phrase editing functions. The CCG editing functions consist of a means of extracting the CCG values from existing CCG phrases in the web page being edited, forms for entering and modifying the extracted CCG values, a layout view browser window for altering how the CCG-data displays (position, font size, face, colour, bold, normal, hiding or showing and so forth), a data view browser window to alter which CCG-data values are to be indexed or not indexed in search engine databases, and a means of deleting existing CCG phrases from web pages and inserting new or changed CCG phrases in web pages. Editing cursors marking the current location at which text and/or data may be inserted, deleted or modified are provided in each window and form.

In the current example, the web page initially contains no CCG phrase. Clicking the CCG editing function button of the authoring tool causes a form to appear. The form contains prompts related to CCG attribute names and associated data input fields related to the CCG attribute values associated with the CCG attribute names, that is CCG-data. The fields are blank because, in the web page layout view, the edit cursor is not over a CCG phrase (and can not be since the web page initially contains no CCG phrase). The service classifications relevant to the web age, John Williams physical business contact address, phone and fax numbers, email address and geographic location and his post office business contact addresses are entered into the forms using a keyboard and mouse. The developer, Alice Jamieson, also includes her basic contact details where provided for on the form. The forms use drop down lists to select address blocks (eg physical and post office) for editing. Logic associated with the forms validates the CCG attribute values and interdependencies. Input devices are then used to control the CCG-data layout view browser to modify the appearance of the CCG-data such as font size and colour and positioning. In the layout browser, input devices communicating with the edit cursor are used to highlight individual items and blocks of items to be changed. The post office address is highlighted as a block and moved into position in line with the physical address. The CCG-data view window is then used to check which data items are to be indexed by search engines. In this example all CCG-data (ie all CCG attribute values except display control values and database control values) are to be indexed. Input devices are used to control the edit cursor to highlight the entire data and a mouse is used to click (activate) a button to mark all the data for indexing. Then another button is clicked which builds an HML encoded CCG phrase of CCG attributes derived from the CCG-data values, display control values and database control values and inserts the CCG phrase in the web page at the location pointed to in the web page layout browser window.

The HTML code editing mode window was called up which revealed the following HTML encoded CCG phrase in the web page:

```
<XML>
<CCG>
   <INDEX/>
   <HIDE/>
   <CN>ANZSIC</CN>
   <CC>D36.11.45;Electrical contractors - residential</CC>
   <CC>D36.11.46;Electrical contractors - industrial</CC>
   <SHOW/>
   <CONTACT/><COPYRIGHT/>
   <BUSINESS/>
   <XPOS>50</XPOS>
   <YPOS>320</YPOS>
   <ALIGN>centre</ALIGN>
   <SIZE>3</SIZE>
   <COLOR>black</COLOR>
   <FACE>Times New Roman</FACE>
   <BOLD/>
   <CLEAR>all</CLEAR>
   <TEXT>Contact:</TEXT>
   <PNC>Mr</PNC>
   <PNG>John</PNG>
   <PNF>Williams</PNF>
   <PQ>AIE</PQ>
   <PA>ARUC</PA>
   <NEWLINE/>
   <PT>Managing Director</PT>
   <NEWLINE/>
   <ON>Kelso Electrical Pty. Ltd.</ON>
   <NEWLINE/>
   <NORMAL/><ITALIC/>
   <SIZE>-2</SIZE>
   <TEXT>NSW License 45678C</TEXT>
   <NEWLINE/>
   <NORMAL/><BOLD/>
   <SIZE>+2</SIZE>
   <AT>PHYSICAL</AT>
   <AS#>18<AS#>
   <ASN>Raglan Street<ASN>
   <NEWLINE/>
   <ACN>Kelso</CAN>
   <NEWLINE/>
   <ARN>NSW<ARN>
   <NEWLINE/>
   <HIDE/>
   <ANN>Australia</ANN>
   <NEWLINE/>
   <SHOW/>
   <TEXT>Phone:</TEXT>
   <TT>PREFERRED; VOICE; MESSAGE</TT>
   <HIDE/>
   <TC#>61</TC>
   <SHOW/>
   <TT#>0</TT#>
   <TA#>63</TA#>
   <TL#>456-7828</TL#>
   <TEXT> Fax:</TEXT>
   <TT>FACSIMILE</TT>
   <HIDE/>
   <TC#>61 </TC#>
   <SHOW/>
   <TT#>0</TT#>
   <TA#>63</TA#>
   <TL#>456-7829</TL#>
-continued
   <NEWLINE/>
   <ET>INTERNET</ET>
   <EA>johnw@firefly.com.au<EA>
   <TEXT> </TEXT>
   <GLU>LatLong</GLU>
   <GL>="33.3978S;148.5679E</GL>
   <GLRU>Km</GLRU>
   <GLR>30</GLR>
   <SET_SEPARATOR/>
   <XPOS>250</XPOS>
   <YPOS>320</YPOS>
   <NEWLINE/>
   <NEWLINE/>
   <TEXT>Or write to us at :</TEXT>
   <NEWLINE/>
   <ON>Kelso Electrical Pty. Ltd.</ON>
   <NEWLINE/>
   <AT>POST-OFFICE</AT>
   <AP#>P.O. Box 187</AP#>
   <NEWLINE/>
   <APN>Sunny Corner</APN>
   <TEXT></TEXT>
   <APC>2795</APC>
   <NEWLINE/>
   <HIDE/>
   <ANN>Australia</ANN>
   <SET_SEPARATOR/>
   <HIDE/>
   <DEVELOPER/>
   <BUSINESS/>
   <PNG>Alice</PNG>
   <PNF>Jamieson</PNF>
   <ET>INTERNET</ET>
   <EA>alijam@firefly.com.au</EA>
   <IURL>www.firefly.com.au/~aljam/<IURL>
</CCG>
</XML>
```

In the web page layout browser window the CCG-data displayed as follows:

| | |
|---|---|
| Contact: | Or write to us at: |
| Mr John Williams, AIE, ARUC, | Kelso Electrical Pty Ltd |
| Managing Director | P.O. Box 187 |
| Kelso Electrical Pty. Ltd. | Sunny Corner 2795 |
| NSW License 45678C | |
| 18 Raglan Street | |
| Kelso | |
| NSW | |
| Phone: 063-456-7828 Fax: 063-456-7829 | |
| Email: johnw@firefly.com.au Map | |

Having encoded the web page in this way, Alice then posts it on the storage device of a digital computer connected to the Internet from where it can be retrieved through the Internet using the URL "www.firefly.com.au/~johnw/index.html"

Example 4

Constructing a Database from Web Pages Containing CCG-data

During a routine sweep of Internet connected web page servers, a web crawler (or robot) operating on a server named "ccg.search.com" executing on an Internet connected digital computer discovers the URL "www.firefly.com.au/~johnw/index.html" in a document it had previously retrieved through the Internet. The web crawler decides that the URL matches it's selection criteria because the URL contains the suffix ".html". The web crawler then successfully retrieves the document by extracting from the URL the address of the computer hosting the document, addressing and sending a message (including the address of the web crawler) requesting the web page through the network to the web page host computer using TCP/IP protocol, the host computer then reads the document, addresses and sends the document to the web crawler using TCP/IP protocol, the web crawler then waiting until it has received all parts of the web page from the host computer before proceeding. It inspects the contents of the document and finds that it matches the additional selection criteria that it is an HTML encoded document. The web crawler program, depending on its state and logic, then parses the document, strips out and saves some or all of the URLs in the document for future examination. The web crawler program then passes the document, together with the URL of the document through a network communications channel to an indexing program executing on a different computer. The indexing computer has database updating software which manipulates a database stored on computer-readable media.

The indexing program parses the document, from first to last character, indexing some of the meta data in the <head> of the document and the words in the text of the document with respect to the document URL. In the database of this example, unique words extracted from the documents already indexed are held in separate rows of a column of a database table and in another column of the same table on each row is an associated pointer to the first bucket or block of URLs of documents containing the word associated with the pointer. As new words are found, the new word is added as a new row in the word column of the table, a new bucket is created, the URL of the document containing the new word is inserted into the bucket and a pointer to the new bucket is written in the new row pointer column. When the same word is found in another document, the row in the table of the word is found, the pointer is retrieved from the table, the bucket pointed to by the pointer is retrieved and the URL of the other document is inserted in the bucket. Where a bucket becomes full of URLs, a new bucket is created and a pointer to the new bucket for holding additional URLs is placed in the full bucket. Deletion of words and URLs of changed or no longer existing documents is also provided for.

In addition to indexing words extracted from the text of the document, the indexing program also indexes the CCG-data in the document as well as indexing words found in the CCG-data. When the parser finds HTML element "<XML>" in the document it switches into XML parsing mode and switches out of that mode when "</XML> is found. When the element "<CCG>" is found, the parser switches into the CCG parsing mode and switches out of that mode when "</CCG>" is found.

The example database has a CCG-data attribute name to database property name correspondence table to show the relationship between the CCG-data attribute names and the database tables and columns (properties) where the CCG-data attribute values are to be stored in the database as database property values. The database property values and associated URLs are stored in much the same way as for words extracted from text as outlined above. However, CCG contact data, for example, which consists of several distinct CCG-data attributes which are related (eg street name, city), is stored in a database table having a column (property) related to each distinct CCG contact attribute name and each separate CCG contact data set (eg person's name, address, telephone number) as separated by "<CCG>", "<SET_SEPARATOR>" and "</CCG>" is held in a separate row in the table. The values stored in each row are considered to be a set of associated property values of different types.

The indexing program, during parsing the document of Example 2 above, encounters the "<CCG>" element and enters the CCG parsing mode. The parser knows to ignore display control attributes and to consider database control elements in the CCG phrase. The example indexing program opts to index all other CCG-data contained in the attribute values until explicitly instructed not to index the attribute values by encountering the "<NOINDEX/>" database control element and then to recommence indexing when the "<INDEX/>" database control element is encountered.

Taking each CCG-data attribute name and associated attribute value(s) in succession, the example indexing program uses the correspondence table to translate the CCG-data attribute name to the database table and column (property) names where the CCG-data attribute value(s) are to be stored as database property value(s). The indexing program may opt to translate the CCG-data attribute values to database property values by, for example, converting character strings of digits to binary encoded decimal representation, the string "True" to a single bit representation and the like. The indexing program then adds or updates the database property value(s), using the database table and column (property) names (or similar references) obtained by translation, in much the same manner as outlined above for the update of the database using words extracted from the document text, including associating the data to the document URL where desired. Where the CCG-data contains a "HREF" attribute (or similar), the URL associated with the other CCG-data is a URL taken from the "HREF" attribute value or composed of the document URL and the "HREF" attribute value if the attribute value is a partial or relative URL. Some CCG attributes, such as "<BUSINESS/> have only an implied value of true if the attribute is present and false if the attribute is absent, the "<SET_SEPARATOR/>", "<CCG>" and "</CCG>" resetting such values to false. However, where attribute value(s) associated with different attribute names are still related, such as a person's name and a street name, the related values of different types are stored on the same row of the same database table but in a different column (database property) to preserve the relationship. "<SET_SEPARATOR/>" limits the degree of relatedness between, for example, a person's name occurring before the separator and a street name occurring after the separator. Using the example document and using the same database column (property) names as used for the CCG-data attribute names a portion of the table constructed database table would look like:

| | PNC | PNG | PNF | PQ | PA | PT | | URL |
|---|---|---|---|---|---|---|---|---|
| ... | ... | ... | ... | ... | ... | ... | ... | ... |
| ... | Mr | John | Williams | AIE | ARUC | Managing Director | ... | (pointer) |
| ... | ... | ... | ... | ... | ... | ... | ... | ... |

Difficulties not highlighted by this example are the need to handle properties having multiple values of the same type, "sparse rows" where only a few values are not null (blank) and tables with extremely large numbers of rows. For example, the CCG-data of this example could have contained multiple values of personal qualifications ("PQ"). To represent this type of data using a 2 dimensional table database system, the database would be "normalised" so that the multiple values were stored in a separate table and keys or pointers were used to relate the relate the items in the two tables. Numerous alternate database systems, for example those based on key hashing and data buckets, or tagging data values with prefixes or suffixes related to the type of data value may be used. Preferably, however, whatever database system is used, it should preserve the associations of CCG-data items present in the CCG phrases.

Because the geographic location data was missing from the postal address of the CCG-data in the example document, but a post code was present, the indexing program inferred the geographic location from the post code.

Example 6

Finding Web Page References Using a CCG Database

As an example, Kevin Robson lives in Sydney but owns and has rented out a house in Bathurst. He wants to use the web to find some electricians based in the general Bathurst region (not only in Bathurst City) to contact for estimating the cost of modifying the wiring in the house. He uses his web browser to open the web page "www.ausline.com.au/web_search.html" containing AusLine's search engine web page search criteria input form encoded using the HTML "<form>" element.

The search criteria input form contains several input fields including those labelled "Service classification", "Key words", "City./Suburb/Town", "Country", "Lat/Long" and "Radius". The form also displays a button labelled "Map" to allow latitude and longitude to be selected by pointing to map images. The word "electrician" is typed into the "Service classification" field, "house wiring" into the "Keywords" field, "Bathurst" into the "City/Suburb/Town" field and "10" into the field "Radius". The country "Australia" was already showing in the country field because the web page server had received cookie data from the browser indicating that that was the country used when the browser last used the web page. The "submit search" button on the web page was clicked. The browser transmitted a message using TCP/IP protocol to the AusLine server containing the input field values encoded in the header of the message.

After a short delay, the search result HTML encoded web page was returned. Clicking on the "Service classification" input field drop down list box to check the classifications used in the search revealed three items:

Electrical contractors-residential

Electrical contractors-industrial

Electrical engineers

The search engine attached to the server obtained those classifications by using word stemming and searching the text of the service classifications held in it's database. The Lat/Long field contained the value "33.3856S; 148.5743E" which the search engine obtained by looking up the latitude and longitude of the town "Bathurst" in the country "Australia" in it's database. Clicking on the "Map" button retrieved a web page having the image of a map centered on the town of Bathurst and showing the area 20 Km around it.

The search engine obtained the map by making a request to another Internet connected server and supplying the latitude, longitude and radius. Clicking on the browser "Back" button returned to the search results page.

The search results contained 8 titles, brief descriptions and URLs including a reference containing the URL "www.firefly.com.au/~johnw/index.html". Retrieving each in turn revealed that all were well focused according to the search criteria being related to electricians, electrical contractors and engineers in the Bathurst area. The search engine obtained these references to web pages by:

searching it's database of service classification titles with words stemming from "electrician" which resulted in three service classification codes, searching it's database using the three service classification codes to obtain an intermediate list of URLs of web pages containing those CCG codes searching it's database for the two keywords to obtain an intermediate list of URLs of web pages containing those words in the web page text, Searching it's database to find the latitude and longitude of Bathurst, Australia, searching it's database to obtain an intermediate list of web pages which contain latitude and longitude data lying within 10 Km of the latitude and longitude of Bathurst, Australia, producing as a result list, a list of URLs which are common to all the intermediate lists, obtaining from it's database the title and brief description of the web pages, formatting the titles, descriptions and URLs into an HTML encoded report, transmitting the report to the enquiring web browser.

Example 7

Finding Contact Details Using a CCG Database

As an example, Jim Jones of Jones and Sons wants to send a recall notice about a faulty batch of UV stabilised electrical power cable to all Electrical contractors and Electrical wholesalers in Australia who have email addresses. He uses his web browser to open the web page "http://www.ausline.com.au/contact_search.html" containing AusLine's search engine contact search criteria input form encoded using the HTML "<form>" element.

The search criteria input form contains several input fields including those labelled "Service classification", "Country" and "Output format". The word "electric*" is typed into the "Service classification" field, the word "Australia" is typed into the "Country" field and the "Tabular—Name & Email" option in the "Output format" drop down list box is selected. The "Submit search" button on the web page is clicked. The browser transmits a message using TCP/IP protocol to the AusLine server containing the input field values encoded in the header of the message.

After a short delay, the search result HTML encoded web page is returned. Clicking on the "Service classification" input field drop down list box to check the classifications used in the search revealed too many classifications for the result to be sufficiently focused. The following four classifications were selected from the list:

Electric cable-ducting systems

Electrical contractors-residential

Electrical contractors-industrial

Electrical wholesalers and the "Submit search" button is pressed again to refine the search.

The search results contained 3,473 names and associated email addresses and URLs to full contact details. Jim saved the search result page on his computer so that he could use his email program to send the recall notice to each email address in the list. The email address "johnw@firefly.com.au" was included in the list.

The search engine obtained these references to web pages by:

searching it's database using the four service classification titles which resulted in four service classification codes, searching it's database using the four service classification codes to obtain an intermediate list of database primary keys of database table rows containing those service classification codes in the database Service classification attribute, searching it's database using the country name "Australia" to obtain an intermediate list of database primary keys of database table rows containing that word in the database Country attribute, producing as a result list, a list of database primary keys which are common to both the intermediate lists, obtaining from it's database using the result list the values of the name and email attributes, using the HTML <table> element to format the name values, email values and full detail URLs into an HTML encoded report, transmitting the report to the enquiring web browser.

This example relates to finding sets of associated database contact values without requiring references to web pages. However, finding other sets of associated database values such as sets of associated industry classification values and geographic location values might also be useful for some purposes.

Thus it is appreciated that the afore stated goals, advantages and objectives are achieved by the teachings herein. In particular it is seen that, unlike the prior art, efficiently searchable Yellow pages and White pages databases and the like may be automatically constructed from HTML encoded web pages. Additionally the database entries may be automatically linked to specific web pages and portions of web pages allowing convenient methods of indexing of product and service catalogues and the like. It is also appreciated that simpler methods of constructing databases suited to a variety of other uses such as industry and subject directories are also provided.

From the foregoing teachings and with the knowledge of those skilled in the art, it is apparent that other modifications and adaptations of the invention will become apparent. For example, the method steps disclosed and claimed herein may be practiced in a variety of different orders. CCG-data may take on a variety of different forms within the meaning of the claims. Thus, it is our intention to include within the scope of the claims not only the invention literally embraced by the language of the claims but to include all such modifications and adaptations which may come to those skilled in the art.

What I claim is:

1. An HTML encoded web page embodied on a computer-readable medium, said web page comprising at least one HTML encoded CCG phrase, each CCG phrase comprising:

a) HTML code indicative of the start of a CCG phrase, b) at least one CCG-data attribute, and c) HTML code indicative of the end of a CCG phrase.

2. An HTML encoded web page embodied on a computer-readable medium, said web page comprising at least one HTML encoded CCG phrase, each CCG phrase comprising:

a) HTML code indicative of the start of a CCG phrase, b) at least two CCG-data attributes, c) at least one database control attribute separating said CCG-data attributes into at least two sets of CCG attributes, and d) HTML code indicative of the end of a CCG phrase.

3. An HTML encoded web page embodied on a computer-readable medium, said web page comprising at least one HTML encoded CCG phrase, each CCG phrase comprising:

a) HTML code indicative of the start of a CCG phrase, b) at least one CCG-data attributes, c) at least one attribute of: database control attributes, display control attributes; and d) HTML code indicative of the end of a CCG phrase.

4. A computer implemented method of building a web page comprising at least one HTML encoded CCG phrase, the method comprising the steps of:

a) displaying a web page on a computer display device, b) displaying an edit cursor indicating a character position on said display device and a corresponding character position in said web page, said edit cursor being positionable within the display of said web page by use of computer input devices, c) separately displaying on said computer display device a set of edit controls representing CCG-data attribute types, d) positioning said edit cursor within said display of said web page using said input devices, e) selecting an edit control from said set of edit controls using said input devices, f) relating said selected edit control to a corresponding CCG-data attribute name, g) constructing a CCG-data attribute character string comprising a character string representing said attribute name and another character string representing an empty CCG-data value, h) if the said edit cursor is positioned outside a CCG phrase, i) inserting into said web page, at the character position indicated by said edit cursor, a start character string comprising HTML code indicative of the start of a CCG phrase, ii) inserting into said web page, immediately after the end of said start character string, an end character string comprising HTML code indicative of the end of a CCG phrase, and iii) positioning said edit cursor between said start and end character strings, i) inserting said CCG-data attribute character string into said web page at the character position indicated by said edit cursor, j) positioning said edit cursor at the character position in said web page of the CCG-data value of said inserted CCG-data attribute character string, k) inputting characters using a keyboard, l) inserting said input characters into said web page at the character position indicated by said edit cursor, thereby converting said empty CCG-data value to a non-empty CCG-data value, and m) writing said web page on computer-readable media.

5. A computer implemented method of building a web page comprising at least one HTML encoded CCG phrase, the method comprising the steps of:
   a) displaying a web page on a computer display device,
   b) displaying a start edit cursor and an end edit cursor on said display device, each said edit cursors indicating a character position on said display device and a corresponding character position in said web page, said edit cursors being positionable within the display of said web page by use of computer input devices,
   c) separately displaying on said computer display device a set of edit controls representing CCG-data attribute types,
   d) selecting a string of web page characters on said display device using said input devices to position said start edit cursor to indicate the start said string of web page characters and said end edit cursor to indicate the end of said string of web page characters,
   e) selecting an edit control from said set of edit controls using said input devices,
   f) relating said selected CCG-data control to a corresponding CCG-data attribute name,
   g) constructing a CCG-data attribute character string comprising a character string representing said attribute name and another character string representing a CCG-data value containing said string of web page characters,
   h) deleting said string of web page characters from said wen page,
   i) if the said start edit cursor is positioned outside a CCG phrase,
      i) inserting into said web page, at the character position indicated by said start edit cursor, a start character string comprising HTML code indicative of the start of a CCG phrase,
      ii) inserting into said web page, immediately after the end of said start character string, an end character string comprising HTML code indicative of the end of a CCG phrase, and
      iii) positioning said start edit cursor between said start and end character strings,
   j) inserting said CCG-data attribute character string into said web page at the character position indicated by said start edit cursor, thereby converting said string of web page characters to a CCG-data attribute value contained within a CCG-data attribute contained within CCG-phrase, and
   k) writing said web page on computer-readable media.

6. A computer implemented method of building a web page comprising at least one HTML encoded CCG phrase, the method comprising the steps of:
   a) displaying a CCG-data input form on a computer display device,
   b) inputting CCG-data values into fields of said data input form using computer input devices,
   c) inserting into the body of a web page a start character string comprising HTML code indicative of the start of a CCG phrase,
   d) inserting into said web page body immediately after the end of said start character string an end character string comprising HTML code indicative of the end of a CCG phrase,
   e) extracting successive field values from said data entry form together with related field value type information,
   f) relating the type of each extracted field value to a corresponding CCG-data attribute name,
   g) constructing a CCG-data attribute character string comprising a character string representing said attribute name and another character string representing said field value,
   h) inserting said CCG-data attribute character string into said web page between said start and end character strings.
   i) writing said web page on computer-readable media.

7. A method of displaying a web page comprising at least one HTML encoded CCG phrase, the method comprising the steps of:
   a) retrieving a web page from a computer network,
   b) parsing said retrieved web page to locate an HTML code indicative of the start of a CCG phrase,
   c) parsing said located CCG phrase and extracting successive CCG attributes contained therein until an HTML code indicative of the end of said CCG phrase is found,
   d) from each extracted attribute, deriving an attribute name,
   e) determining the type of said extracted attribute by reference to its derived attribute name,
   f) relating said type of attribute so determined to one of the following attribute types: database control, display control, CCG-data,
   g) provided said extracted attribute is not a database control type, deriving an attribute value related to its attribute name from said extracted attribute,
   h) determining the type of said attribute value by reference to said attribute name,
   i) relating said type of attribute value so determined to a corresponding type of parameter of a display-device-control-program,
   j) writing said attribute value to said parameter, and
   k) where said type of attribute is a CCG-data type, causing said display-device-control-program to effect display of said attribute value on a display device, formatted and positioned according said display-device-control-program parameters whereby successive values of CCG-data of the CCG phrase are displayed.

* * * * *